July 8, 1969  J. F. ROESEL, JR  3,454,864
ELECTRIC POWER GENERATOR FOR GENERATING POWER OF A
PREDETERMINED FREQUENCY, MAGNITUDE, AND WAVE FORM
Filed April 4, 1966  Sheet 1 of 4

JOHN F ROESEL, Jr.
By Robert Meyer
atty

JOHN F. ROESEL, Jr.

United States Patent Office 3,454,864
Patented July 8, 1969

3,454,864
ELECTRIC POWER GENERATOR FOR GENERATING POWER OF A PREDETERMINED FREQUENCY, MAGNITUDE, AND WAVE FORM
John F. Roesel, Jr., Sarasota, Fla., assignor to Jebco, Inc., Jonesboro, Ga., a corporation
Filed Apr. 4, 1966, Ser. No. 540,001
Int. Cl. H02p 9/10
U.S. Cl. 322—24                    15 Claims

ABSTRACT OF THE DISCLOSURE

The present invention comprises in essence an electric power generator which includes an armature and an excitation field, one of which is rotatable and includes mechanical or electrical means for producing an excitation flux of predetermined frequency wave form and magnitude which is passed through the excitation field and armature, commutation means for switching from the armature whereby the frequency, wave form and magnitude of the power output of the generator will be held constant regardless of the speed of rotation of said shaft. One adaptation of the invention provides commutation means in the form of solid state switches, whose conductive state is controlled by shaft positive so that as the shaft rotates they are alternately operated and transmit the generator power to buss rings or suitable means of collecting the power and transmitting it to use. Thus controlling the frequency wave form and magnitude of the excitation current, an alternating current from the generator will be provided with a definite regulated frequency wave form and magnitude regardless of the speed of rotation of the rotatable element of the generator.

---

This invention relates to electric power generators and primarily to an electric power generator whereby the frequency and wave form of the generated power may be predetermined, regulated, controlled and maintained regardless of the speed of rotation of the rotary element (either the armature or field) of the generator above a low minimum speed.

In the A.C. electric power generators now in use, this is not possible since certain predetermined speeds of rotation of the rotary elements must be accurately maintained to provide desired predetermined frequency and wave form of the power generated. Should the rotative speed vary the frequency of the generated electric current is affected resulting in highly undesirable effects and breakdowns in the system. Thus with present day electric power generators complicated and expensive speed regulation and control mechanisms are necessary, and in instances where a number of generators are employed (as in utility systems), expensive, delicate synchronizing mechanisms must be employed, because if one generator in the system is out of synchronism with the others the whole is thrown out of order, as in the recent black-out in the northeastern part of the country.

A generator of the present invention may be driven by any suitable prime mover and will maintain the desired predetermined frequency and wave form of the power output regardless of changes in speed of the prime mover as circumstances of its function may require.

For example, the generator may be driven directly from the motor or engine of a boat for the purpose of generating electric power to operate auxiliaries on the boat, and will provide electric power output of the desired frequency and wave form regardless of the speed of operation of the motor or engine as may be required for various speeds of travel of the boat, without the use of speed regulators, of any type; thus eliminating an extra prime mover to operate the generator, speed regulators, etc. as are now required.

The above stated fields where the generator of the present invention may be advantageously employed are only two, and one familiar with the art of using electric power will readily recognize a multitude of other fields where the generator can be advantageously employed, to save in costs of installation, costs of operation, provide better conditions of operation; such as for instance the transportation field, including trucks, buses, electric locomotives, passenger vehicles etc., the power tool field where precision operation is necessary; in the national defense field wherein it could be used to supply power to accurately turn gun turrets or large disk antennas, and many other uses where precision movements are vital.

Another significant advantage of the generator of the present invention is that generators can be constructed with several times the kw./lb. ratio (that is kw. output per pound of weight of the machine) than is possible with conventional A.C. generators or alternators; in that the present generator allows any practical speed of rotation to be employed in as much as frequency is not the limiting factor of speed of rotation of the generator. Thus not only will material savings in cost be provided by reducing the quantity of materials (such as copper, etc.) employed in constructing the generators, but it will permit the construction of lightweight portable generators.

Another advantage of the present invention is that by a simple, easily operated mechanism (such as by the turning of a dial) the frequency and/or wave form of the electric power output of the generator may be changed rapidly to another frequency or wave form as may be desired or required without in any way effecting or altering the speed of rotation of the rotative parts of the generator.

In the drawings various forms of the generator are shown diagrammatically rather than in detail of component parts, since all component parts are well known in the industry and are purchaseable on the open market, the invention residing in their unique assembly in combination and mode of operation to provide the new and novel manner of producing electric power.

In the drawings.

The constant frequency generator of the present invention may be constructed in two general forms, that is with a rotating armature and a stationary field (as will be described first) or with a stationary armature and a rotating field as will be described in the alternate form.

Figure 1:
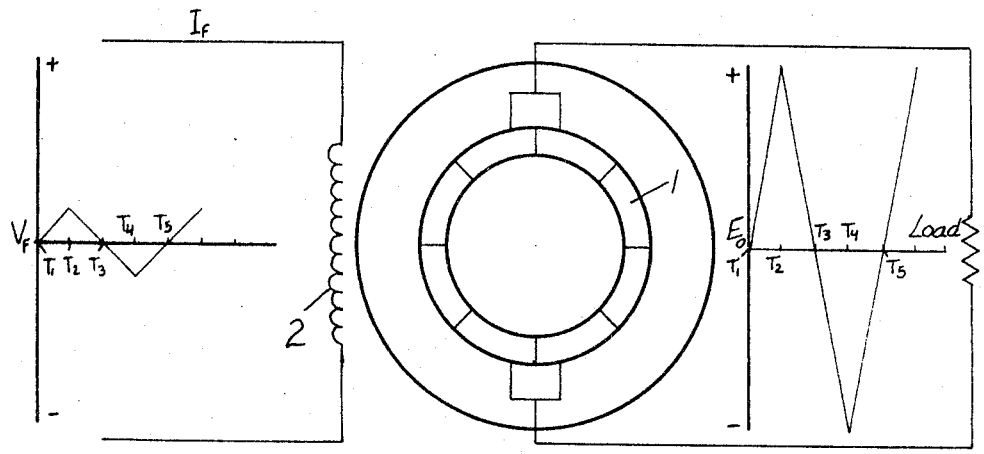
FIGURE 1 is a diagrammatic view of a generator of present invention illustrating the basic principle of the invention.

FIGURE 1 of the drawings shows in diagram a generator which displays the basic characteristics of the invention. It is to be understood that the physical consruction of the generator may be similar to a standard direct current generator familiar to anyone skilled in the art, with the possible exception that the stationary field poles and support structure is assembled of high quality laminated electrical steel instead of solid iron or steel. At it is well known that the level and polarity of field current in a direct current generator and the corresponding flux produced determines the level and polarity of the output voltage (for a generator running at a constant speed and direction); the operation of the generator may be understood by referring to the wave forms of the field excitation and current output voltage shown in FIGURE 1 as follows:

As the time shown as $T_1$ it can be seen that since there is no excitation voltage there is no output from the generator terminals. As the field current increases in a positive direction the output voltage also increases positively until the time shown as $T_2$ at this point both the field current and output voltage start to reduce until time $T_3$ where once again the field current i zero with corresponding zero output from the generator. At this point the field current reverses and begins to increase in the negative direction, this causes the output of the generator to also reverse and increase in a negative direction until point $T_4$ is reached. At this time the field current and corresponding output voltage begins to decrease until at $T_5$ there is once again zero output at the generator terminal.

It can therefore be seen from the above that the output frequency and wave form of the generator is determined by the frequency and wave form of the field excitation.

Figure 2:
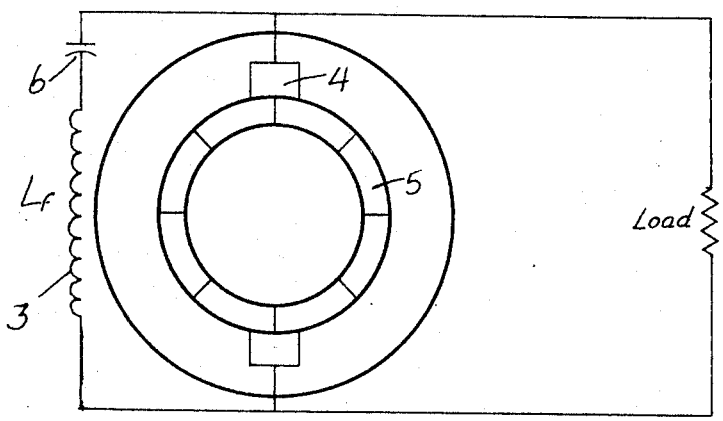
FIGURE 2 is a diagrammatic view illustrating a method of self exciting the field of the generator.
Figure 3:
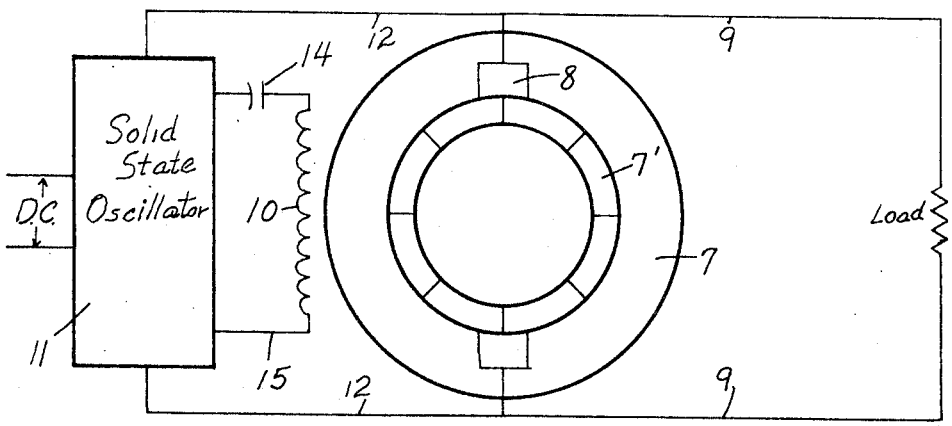
FIGURE 3 is a diagrammatic view illustrating another form of controlling the excitation of the field of the generator.
Figure 4:
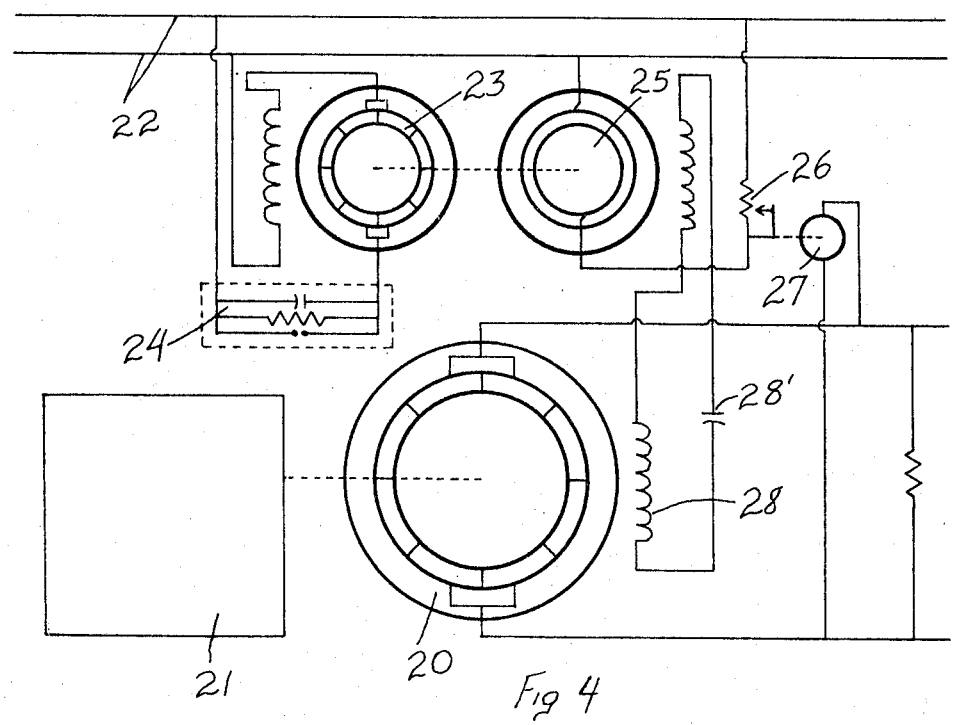
FIGURE 4 is a diagrammatic view illustrating a system and apparatus for providing control of the frequency and/or wave form of the generator output as well as providing means for voltage regulation of the generator output.

In as much as the field excitation power required is a very small part of the available power output from the generator there are many practical methods for obtaining field excitation current of the desired frequency and wave form such as a conventional constant or variable speed A.C. generator as shown in FIGURE 4 of the drawings; from an oscillator of suitable design and construction as shown in FIGURE 3 of the drawings, or the field 2 of the generator may be self excited by the output current of the generator as shown in FIGURE 2 of the drawings.

In the form shown in FIGURE 2 of the drawings part of the generated current is fed back to the excitation field 3 from the commutation zone and brushes 4 of the rotating armature 5 through a capacitor 6 which is tuned to the field inductance $L_f$ for the desired frequency.

The form of the invention shown in FIGURE 3 of the drawings, embodies a rotating armature 7 having the usual commutation means 7' and current pickup brushes 8 through which the generated electric current passes to a load through the connections 9. The field 10 of generator receives its excitation current from a solid state oscillator 11 which receives D.C. electric current from a suitable source (not shown) and reference voltage through suitable connections 12 with the power output connections 9. The oscillator 11 determines the wave form in combination with the tuned capacitor 14 which is connected in the electric current connection 15 betwen the oscillator 11 and the field 10 and determines the periodic reversal of the exciting current and consequently the frequency of the excitation current and determines the RMS of the excitation voltage in order to obtain the desired characteristics of the power output current of the generator. The oscillator 11 may also be designed to control the voltage of the field 10 as well as the frequency, thereby holding both generator output voltage and frequency constant for varying rotative speeds of the armature.

FIGURE 4 of the drawings illustrates still another form and method of accomplishing A.C. excitation of the field of the generator and one which might be useful on a ship, using the D.C. auxiliary supply on the ship for excitation power, and where the generator is rotated by the main propulsion engine of the ship.

In the showing in FIGURE 4 of the drawings the main generator 20 is directly connected to and driven by the prime mover or populsion engine 21 of a ship (not shown) thus the speed of rotation of the armature of the generator will vary with the speed of operation of the engine 21, which speed will vary according to the demands of its primary job of propelling the ship.

FIGURE 4 shows an arrangement of existing mechanical equipment which may be used to excite the field coils of the main generator 20.

For this example 32 V. D.C. is available, and 110 V. A.C. at 60 cycles is the desired output.

The 32 V. D.C. power available through the wiring 22 powers a series D.C. motor 23. A governor 24 maintains the speed of the motor 23 at 3600 r.p.m. The D.C. motor 23 operates a small double pole pilot A.C. generator 25 of standard rotating field design. The 32-volt excitation for the pilot A.C. exciter generator is controlled by a rheostat 26 in series with it.

The rheostat 26 is controlled by a torque motor or solenoid 27 driven by the output from the main generator 20. The conections are such that as the output voltage from the generator 20 increases the rheostat 26 is adjusted to decrease the rotor current in the exciter generator 25 decreasing the A.C. voltage of the exciter 25 and the field current of the main generator 20. In this manner, voltage fluctuations which could occur across the external load circuit from the generator 20 due to changes in speed of operation of the engine or prime mover 21 or changes in the load current requirements are controlled by changing the strength of the main generator field excitation. The constant speed of the exciter generator 25 maintains the output frequency of the generator 20 at a constant 60 cycles regardless of the speed of rotation of the generator 20. Capacitor 28' may be employed to tune the main field of the generator 20 thereby reducing the volt-amp. requirements of the pilot generator 25.

If the speed of the D.C. series motor 23 driving the A.C. pilot exciter generator 25 is controlled to produce a varied r.p.m., as by adjustment of the governor 24, the output frequency of the main generator 20 will be varied proportionally.

Thus it will be seen that the frequency and wave form of the power output of the generator may be maintained constant regardless of the speed of operation of the engine or prime mover 21 and speed of rotation of the rotary element of the main generator 20. Also it will be apparent that by adjustment of the governor 24 the output frequency of the main generator may be changed and controlled as desired and that the excitation of the field 28 of the main generator 20 and the main generator output voltage is determined by the setting of the voltage determining rheostat 26.

The governor 24 may be of any practical existing construction which may be quickly and easily adjusted as by a dial or other manually operated means.

The systems or arrangement of parts shown in FIGURES 2, 3 and 4 of the drawings show merely examples of the manner of controlling and regulating the frequency and wave form of the power output of a generator and it is to be understood that the invention is not to be limited to the specific examples shown, but shall embrace any suitable practical arrangement and combination of elements which may be available on the market to produce the desired controlled variable frequency A.C. output of the generator.

Also it is to be understood that a governor, such as the governor 24 and or a rheostat such as the rheostat 26 may be employed in any of the systems or forms shown to provide for varying the frequency and wave form of the generator output as well as controlling its voltage.

FIGURES 5 to 8 inclusive of the drawings show a form of the invention wherein the excitation current or flux is provided by a permanent magnet and suitable means are provided to deliver a flux to and through the field and armature of the generator, which flux is of predetermined wave form and frequency to determine the wave form and frequency of the generator output.

Figure 5:
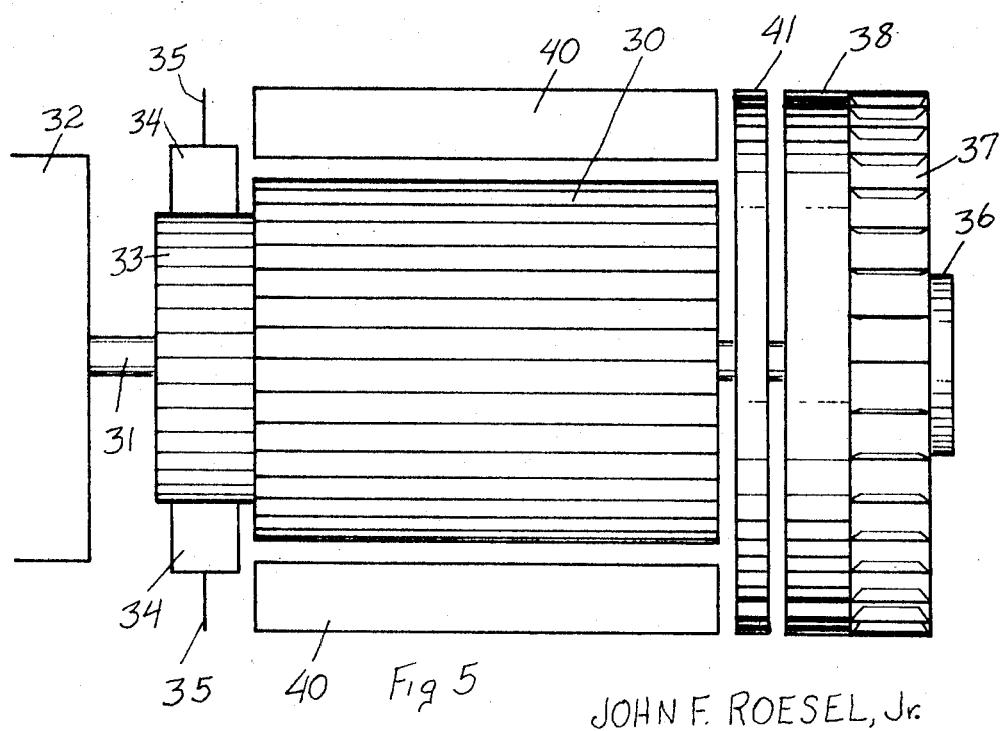
FIGURE 5 is a side elevation of a modified form of the invention utilizing permanent magnets as the magnetic flux producers and providing voltage regulating means.
Figure 7:
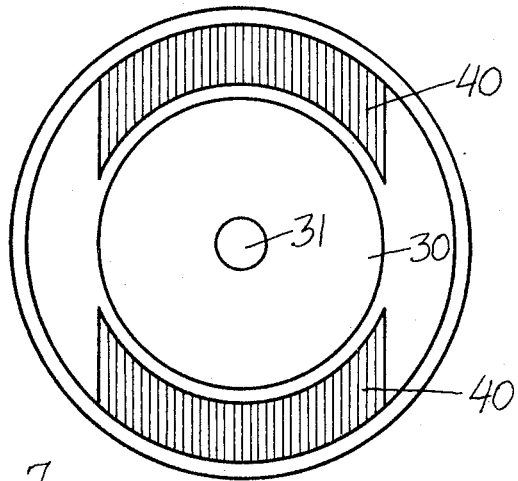
FIGURE 7 is a diagrammatic cross section through the armature and field structures of FIGURE 5.
Figure 8:
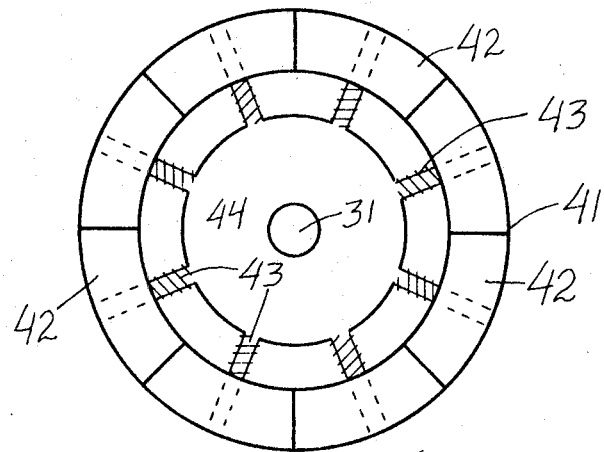
FIGURE 8 is an end view of a form of voltage regulator employed in the form shown in FIGURE 5.
Figure 6:
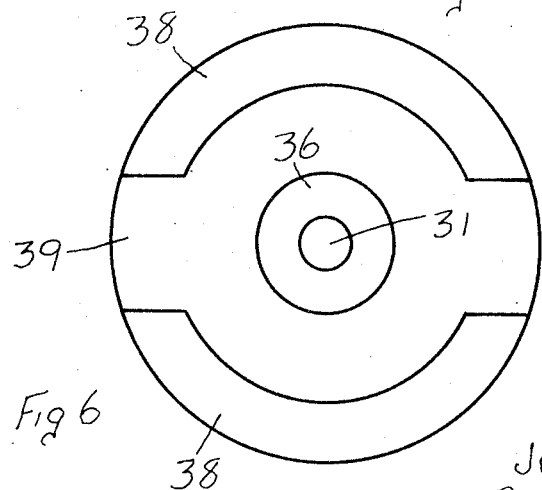
FIGURE 6 is an end view of the permanent magnets as employed in the form shown in FIG 5.

In this form of the invention the armature 30 is mounted on a shaft 31 which is rotated by any suitable prime mover 32. A commutator 33 and brushes 34 are provided for switching from the armature to the load line 35. The field 40 of the generator is in the form of two segments located as shown in FIGURES 5 and 7. A constant speed coupling 36 of any approved construction which may be purchased on the open market, is mounted on the shaft 31 and rotated thereby. A fan 37 may be mounted on the coupling 36 for the dual purpose of cooling the generator and stabilizing the rotations of the coupling.

A permanent magnet assembly 38 is carried by the coupling and rotated thereby and is located a predetermined distance from the ends of the field 40 and armature 30 to provide a flux flow resistance space between the magnet 38 and field 40 and armature 30. The magnet 38 is a two section magnet with spaces between its north and south poles so that as it rotates it will provide an alternating flux flow to the field 40 and armature 30. By controlling the speed of rotation of the magnet 38 the frequency of the flux reversals may be regulated and thus the generator will produce power of a predetermined wave form and frequency, regardless of the speed of rotation of the armature 30.

For the purpose of regulating the voltage of the generator output regardless of the speed of rotation of the armature voltage regulation means are provided. In the form shown in FIGURES 5 and 8 this voltage regulating means is illustrated in the form of a rotary element 41 embodying a plurality of circumferentially spaced members 42 spring loaded by springs 43 and carried by a suitable housing 44 which is mounted on the shaft 31 for rotation therewith at the speed of rotation of the armature 30. The voltage regulator 41 is located in the space between the permanent magnet 38 and the field 40 and armature 30. The members 42 are constructed of laminated steel, ferrite or other suitable material which will act as a conductor for the magnetic flux and will reduce eddy currents in the flux path.

Normally in an electric current generator the voltage increases as the speed of rotation of the armature increases, however as the speed of rotation of the armature 30 increases the members will under increased centrifugal force move outwardly out of the space distances proportionate to their speed of rotation and open the space between the magnet 38 and the field 40 and armature 30 and consequently increase the magnetic reluctance in the path through the field 40 and armature 31 in proportion to the opening of the space between them and the magnet, thus reducing the voltage of the output of the generator and maintaining it at a predetermined voltage.

Figure 9:
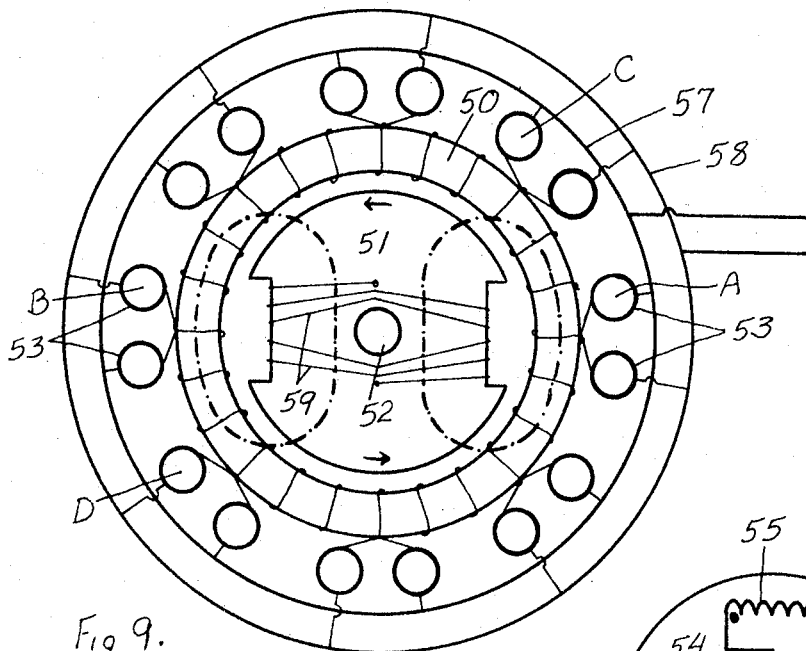
FIGURE 9 is a diagrammatic view of a form of generator employing a stationary armature and a rotating field and embodying electronic commutation means.
Figure 10:
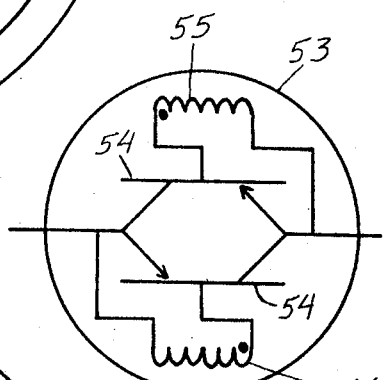
FIGURE 10 is a diagrammatic view of a transistor switch employed in the electronic commutation.
Figure 11:
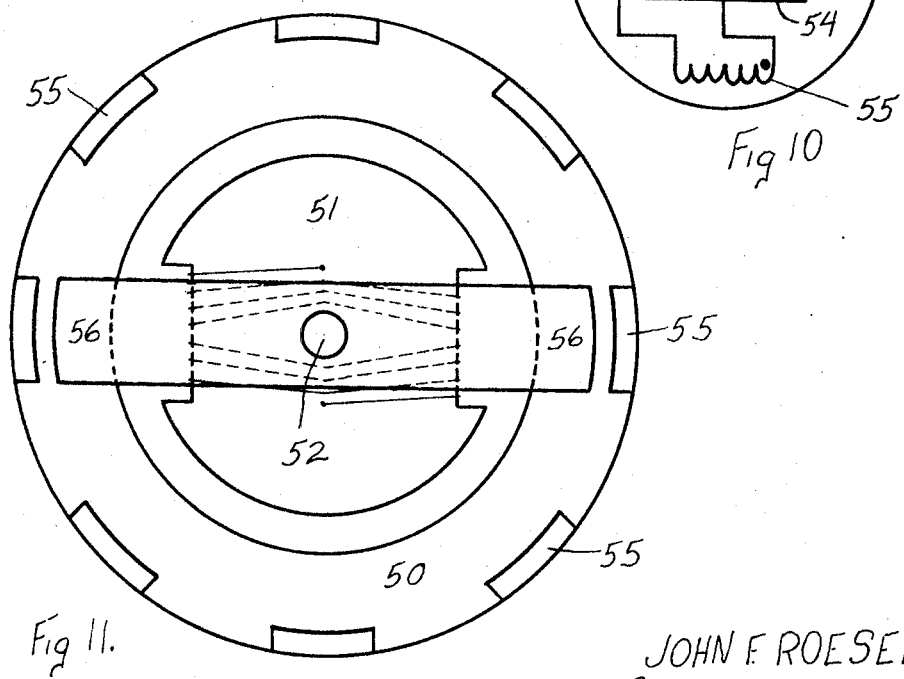
FIGURE 11 is a view showing diagrammatically the location of the transistor switches and their operating magnet.

FIGURES 9, 10 and 11 of the drawings show a form of the generator embodying a rotating field, stationary armature and electronic commutation.

Electronic commutation is essentially the replacement of the mechanical switch composed of the commutator and brushes with solid state switches, whose conductive state is controlled by shaft position.

For ease of explanation and illustration a gramme ring generator is shown in the drawings and will be described, but it is to be understood that the rotatable field, stationary armature type of the present invention is not to be limited to this type of generator as in practice any conventional winding may be employed.

FIGURES 9 to 11 show a gramme ring generator (in diagram) in which the armature 50 is stationary while the excitation field 51 rotates within the armature 50 by means of the shaft 52 which is rotated by any suitable prime mover (not shown).

A plurality of switching elements 53 are mounted in circumferentially spaced relation at one end of the stationary armature 50 and these switch elements are disposed in diametrically opposed pairs as clearly shown in FIGURES 9 and 11 of the drawings.

One of the switch elements 53 is shown in FIGURE 10 of the drawings and each switch element 53 employs two PNP transistors 54 arranged in back to back relation which are driven by magnetically coupled pick up coils 55. It is to be understood that protective circuits or diodes may be employed to protect the transistors from reverse current or overvoltage. These diodes or other protective elements are not shown in the drawings but are common in practical applications of this type. The switch elements 53 are of two types, one where the pickup coil 55 connected thereto will turn the transistors "on" at the approach of a "north" magnetic pole and one where the voltage induced by an approaching "south" magnetic pole will cause the transistor to be turned on (see FIGURE 9).

In order to accomplish the switching of switching elements 53 in phase with the position of the rotating field 51 a switch field pole 56 is provided and is shown in FIGURE 11 of the drawings.

The switch field pole 56 is preferably a permanent magnet mounted on the shaft 52 external to the main field 51, while the pick up coils 55 of the switching elements 53 are mounted on the outer edge of the stationary armature 50 so as to be close to the switching field pole 56 but out of effective range of the main field flux.

The switching elements 53 of each switch structure are connected one to the inner collector buss ring 57 and the other to the outer collector buss ring 58 as shown in FIGURE 9 of the drawings and the output of the generator goes from these busses 57 and 58 to the load.

Referring to FIGURE 9 of the drawings it will be seen that with the field windings 59 energized and rotating a flux will be produced (the flux line of flow is shown by the dot and dash lines) which will cause an E.M.F. to be produced which at the instant shown (in FIGURE 9) will be a maximum between switching elements 53 indicated as A and B. Assuming that the flux is in such a direction as to cause the switch element indicated A to be positive and element indicated B negative and that switching elements A and B are "on" with all the other switching elements "off" then power will flow from the armature 50 through switch elements A and B into the inner and outer collector busses 57 and 58 respectively thereby supplying power to the load.

As the field 51 continues to rotate the voltage at points A and B will begin to decrease and at the same time the voltage at points C and D is increasing. When the voltage at A and B is approximately equal to the voltage at C and D the switching elements A and B are turned off and switching elements 53 at positions C and D are turned "on." This now allows power to flow from the armature 50 through switch elements at points C and D into collector busses 57 and 58 and thus to load.

This sequence is continued as the field 51 rotates so that power flows continuously from the armature 50 into the collector busses 57 and 58. In the sequence described above a direction of field flux and rotation was assumed that would cause the inner buss ring 57 to be positive and the outer buss ring 58 to be negative. If the field flux is now caused to reverse then the E.M.F produced in the armature winding will reverse and since the switch elements are bi-directional and sensitive only to shaft position, this will cause the inner buss ring 57 to become negative and the outer buss ring 58 to become positive at a magnitude determined by the magnitude of the field flux, this magnitude being determined by the magnitude of the excitation current flowing through the field winding 59. It is therefore apparent that the output frequency wave form and voltage derived from the armature is controlled by the frequency, wave form and current magnitude of the excitation energy supplied to the field winding 59.

Although PNP transistors are shown in the drawings as the active device in the switching elements 53 many other types of solid state or electronic devices now well known and purchaseable on the open market could be employed in lieu thereof and also it is possible to utilize types of shaft position indicator other than the magnetically coupled one shown herein such as, for instance the use of a well-known light source mounted on the shaft 52 and photocells used to activate the switching elements 53.

Since the electronic commutation shown in FIGURES 9, 10 and 11 is a replacement of the mechanical commutation means shown in the other forms of this application, it is to be understood that the flux or excitation current employed in the generator structure shown in FIGURES 9 to 11 may be derived from any suitable source of a constant frequency and wave form electric current source as described in connection with the other forms of the invention so as to provide regulation, control or constancy of the frequency and wave form of the power output of the generator regardless of the speed of rotation of the rotary element of the generator. It is also to be understood that the form of generator, that is, one having rotating field and stationary armature, may be employed in any of the forms of the invention embraced herein since generators having stationary fields and rotating armatures, or having a rotating field and stationary armature are shown and described herein.

There is voltage produced between the commutator segments in a mechanically commutated generator by the transformer action of the field-armature magnet circuit which is a maximum in the commutation region. It is necessary to consider this in the design of a generator so that poor commutation will be avoided.

A method of improving poor commutation, in addition to conventional design procedure, is to use an oriented material such as pyrolytic graphite for the brush structures with the grain of the pyrolytic graphite running in the direction of preferred current flow. The use of pyrolytic graphite brushes therefore forces the short circuit current between segments beneath a brush to flow through a higher resistance path than that across the face of a brush made from conventional material, thus reduces significantly the magnitude of this current and the associated arcing and pitting of the commutator bars.

While the words excitation flux is used in describing some forms of the invention and excitation or exciting current is employed in the description of other forms, it is to be understood that the flux is a result or product of the current as employed herein and in consequence the terms flux and excitation or exciting current as used herein are equivalent or interchangeable.

What is claimed is:

1. A generator for generating electric power of a predetermined frequency and wave form which comprises an armature, an excitation field for the armature, means for supplying an excitation current of predetermined frequency and wave form to said field, means for changing the frequency and wave form of the field excitation current, and commutating means constructed and arranged for switching from the armature whereby the frequency and wave form of the power output of the generator is controlled by the frequency, wave form, and magnitude of the excitation current.

2. A generator as claimed in claim 1 wherein said commutating means includes a segmentated commutator and brushes co-operating with said commutator, said brushes being constructed of pyrolytic graphite with its direction of high conductivity parallel to the direction of the preferred current flow thereby resulting in a higher resistance path to short circuit current flow and reducing arcing and pitting of the commutator.

3. A generator for generating electric power comprising an armature and excitation field at least one of which is rotatable, a shaft for rotating the rotating element of the generator, non-electronic mechanical means for producing an excitation flux of predetermined frequency and passing the flux through said field and armature of the generator, commutation means for switching from the armature whereby the frequency and wave form of the power output of the generator will be held constant regardless of the speed of rotation of said shaft.

4. A generator as claimed in claim 3 including mechanical means for changing the frequency of the flux to change the frequency of the generator power output.

5. A generator as claimed in claim 3 including mechanical means for regulating the voltage of the generator output.

6. A generator as claimed in claim 3 including mechanical means for rotating said flux producing means, means for regulating the speed of rotation of said flux producing means at a predetermined speed regardless of the speed of rotation of said shaft to provide alternating excitation flux of a predetermined frequency in order to obtain a predetermined frequency of the generator output regardless of the speed of rotation of the rotatable element.

7. A generator as claimed in claim 6 including mechanical means for regulating the voltage of the generator output.

8. A generator for generating electric power as claimed in claim 3, wherein said excitation field is rotatable and said commutation means comprises solid state switches, said switches being associated with said rotating field in such manner that the electric current conductive state of said solid state switches will be controlled by positions of said shaft during its rotation.

9. In a generator for generating electric power of a predetermined frequency magnitude and wave form comprising a stationary armature, a rotating excitation field, means for providing an excitation current of a predetermined frequency, magnitude and wave form to said excitation field, a shaft for rotating said field, a plurality of solid state switches disposed in spaced relation circumferentially about said armature, means for actuating said switches, said switch actuating means connected to said shaft for rotation thereby whereby the electric current conductive state of said switches will be controlled by positions of said shaft during its rotation, and means for conducting generated power from said armature through said switches to a load, whereby electric power output of predetermined frequency magnitude and waveform may be obtained regardless of the speed of rotation of the shaft.

10. In a generator for generating electric power of a predetermined frequency magnitude and wave form comprising a stationary armature, a rotating excitation field, means for providing an excitation current of a predetermined frequency magnitude and wave form to said excitation field, a shaft for rotating said field, a plurality of solid state switches disposed in spaced relation circumferentially about said armature, means for actuating said switches, said switch actuating means connected to said shaft for rotation thereby whereby the electric current conductive state of said switches will be controlled by positions of said shaft during its rotation, and means for conducting generated power from said armature through said switches to a load, whereby electric power output of predetermined frequency magnitude and wave form may be obtained regardless of the speed of rotation of the shaft, each of said switches includes a switch element sensitive to a "north" magnetic pole and a second switch element sensitive to a "south" magnetic pole, and selective means for controlling operation of said magnetic pole sensitive switch elements, said switches disposed in diametrically opposed simultaneously operated pairs about the armature.

11. An electric power generator as claimed in claim 10, wherein said selective means constitutes a permanent magnet mounted on said rotor in such a manner as to actuate said switch elements.

12. A generator for generating electric power comprising an armature and an excitation field at least one of which is rotatable, a shaft for rotating the rotating element of the generator, non-electronic mechanical means for producing an excitation flux of predetermined frequency, and passing the flux through said field and armature of the generator, means connecting said mechanical means for producing the excitation flux to said shaft and operating the mechancal flux producing means at a constant speed irrespective of the speed of rotation of the shaft, commutation means for switching from the armature whereby the frequency and wave form of the power ouptut of the generator will be held constant regardless of the speed of rotation of said shaft.

13. In an electric power generator as claimed in claim 12, including mechanical means for periodically changing the direction of flow of the flux through said field to provide alternating electric current at the generator output.

14. In an electric generator as claimed in claim 12, including mechanical meansf or changing the frequency of the flux to change the frequency of the generator power output.

15. In an electric generator as claimed in claim 12, wherein said commutation means comprises a plurality of solid state switches disposed in spaced relation circumferentially about said armature, means for actuating said switches, said switch actuating means connected to said shaft for rotation thereby whereby the electric current conductive state of said switches will be controlled by positions of said shaft during its rotation, and means for conducting generated power from said armature through said switches to a load, whereby electric power output of predetermined frequency magnitude and wave form may be obtained regardless of the speed of rotation of the shaft.

References Cited
UNITED STATES PATENTS

| | | | |
|---|---|---|---|
| 3,020,466 | 2/1962 | Race | 322—61 X |
| 3,084,324 | 4/1963 | Sampietro et al. | 322—61 X |
| 2,528,111 | 10/1950 | Buckthal | 322—61 |
| 3,210,631 | 10/1965 | Niccolls | 318—138 |
| 3,229,179 | 1/1966 | Hetzel | 318—254 X |

ORIS L. RADER, *Primary Examiner.*

H. HUBERFELD, *Assistant Examiner.*

U.S. Cl. X.R.

310—68; 318—138; 322—32, 61